UNITED STATES PATENT OFFICE.

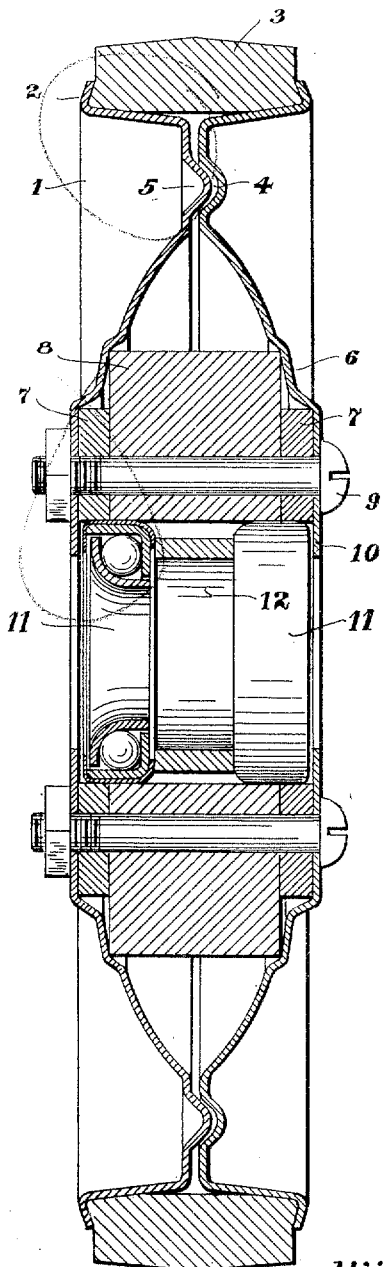

WILLIAM HENRY CLARK, OF SALEM, OHIO, ASSIGNOR TO THE W. J. CLARK COMPANY, OF SALEM, OHIO.

TRUCK-WHEEL.

990,339. Specification of Letters Patent. Patented Apr. 25, 1911.

Application filed October 3, 1910. Serial No. 584,960.

*To all whom it may concern:*

Be it known that I, WILLIAM HENRY CLARK, a citizen of the United States, residing at Salem, Columbiana county, Ohio, have invented certain new and useful Improvements in Truck-Wheels, of which the following is a specification.

This invention, pertaining to improvements in the construction of truck wheels will be readily understood from the following description taken in connection with the accompanying drawing which is a vertical diametrical section of a truck wheel exemplifying my invention.

In the drawing:—1, indicates stamped disks of sheet metal placed face to face to form the web of the wheel: 2, a peripheral flange on each disk: 3, the tire, preferably of rubber, clamped between the flanges 2: 4, recesses, in any number desired, formed in the inner face of one of the disks: 5, projections, one for each of the recesses, projecting inwardly from the face of the second disk and into the recesses 4 of the first disk, the portions of the disks carrying these recesses and projections coming pretty close to each other: 6, the general hub portions of the disks, these hub portions being flat where they immediately surround the eye of the wheel: 7, a flat metallic ring disposed against the inner hub portion of each disk: 8, an annular ring or filler disposed between rings 7 and having a bore substantially equal to that of the rings: 9, bolts, for which rivets may obviously be substituted, passing through the hub-portions of the disks and through rings 7 and, in the illustration, through filler 8: 10, flanges of the hub portions of the disks projecting inwardly beyond the bore of rings 7: 11, a pair of ball-bearing cases disposed within the eye of the wheel, one behind each of the flanges 10, the peripheries of these cases fitting within the rings 7: and 12, a filler-ring disposed between the two cases and serving to hold them out to or near to the flanges 10.

In the illustration the bolts are shown as passing through filler 8 and this is necessary in case the filler has an external diameter too great to permit it to be disposed entirely within the circle of bolts. This filler, if of small radial thickness, I form of metal, while if of considerable radial thickness, as shown in the illustration, I prefer to form it of wood. The filler 8 and the rings 7 form, together, a filler between the hub portions of the two disks and the rings 7 provide a liberal area of contact against the inner faces of the disks. Good results in the use of the wheel necessitate the employment of metal for the rings 7 and, while the filler 8 might be of metal and in one piece with the rings, the forming of it separably and of wood permits a reasonable selection as to the length of wheel hub without the necessity for machining any metal.

The projections 5 and recesses 4 may be formed by properly stamping the sheet metal of which the disks are formed. These projections and recesses are highly important in meeting radial strains and prevent the radial shifting of one disk relative to the other, something which the bolts, no matter how tightly drawn, are not capable of doing in a perfect manner. The ball-bearing cases turn with the wheel within whose eye they are to fit with a fair degree of snugness, the cones of the ball-bearings remaining stationary with the axle which is to pass through them. The ball-bearing cases are held inwardly by the flanges 10 and are spaced apart by filler-ring 12, and two of the ball-bearings cases thus spaced apart are sufficient for a wheel of the proportions indicated in the drawing.

I claim:—

1. In a wheel structure the combination of web plates peripherally flanged to receive a tire, the plates having coöperating projections and depressions to prevent relative movement, the plates also being shaped to form communicating hub recesses of different widths, a filler ring extending into the smaller outer recess, smaller filler rings intermediate the first ring and the web plates and within the larger inner recess and bolts clamping the plates and rings together.

2. In a wheel structure, the combination of web plates provided with coöperating, engaging members for preventing relative movement of said plates, the plates being shaped to form communicating hub recesses of different widths, a filler ring extending into the smaller outer recess, smaller filler rings intermediate the first ring and the web plates and within the larger inner recess, and bolts clamping the plates and rings together.

WILLIAM HENRY CLARK.

Witnesses:
D. BAILEY,
W. S. GREENE.